United States Patent
Yamagata et al.

(10) Patent No.: US 7,742,681 B2
(45) Date of Patent: Jun. 22, 2010

(54) SCRAMBLING CONTENT INFORMATION IN A FIRST RECORDING MEDIUM WHEN DOWNGRADING THE QUALITY OF CONTENT INFORMATION FOR STORAGE ON A SECOND RECORDING MEDIUM

(75) Inventors: Kenji Yamagata, Saitama (JP); Hiroshi Nakamura, Saitama (JP); Kyotaro Sato, Saitama (JP); Kenichiro Tada, Saitama (JP); Tomohiro Miura, Saitama (JP); Toshiro Tanikawa, Saitama (JP); Ken Miyagawa, Saitama (JP); Takashi Aoki, Saitama (JP); Shinya Hashimoto, Saitama (JP)

(73) Assignee: Pioneer Corporation, Tokyo (JP)

( * ) Notice: Subject to any disclaimer, the term of this patent is extended or adjusted under 35 U.S.C. 154(b) by 1444 days.

(21) Appl. No.: 11/124,298

(22) Filed: May 9, 2005

(65) Prior Publication Data
US 2005/0254788 A1    Nov. 17, 2005

(30) Foreign Application Priority Data
May 7, 2004    (JP)    ............................ 2004-138444

(51) Int. Cl.
*H04N 5/76*    (2006.01)
(52) U.S. Cl. ........................................ 386/94; 386/123
(58) Field of Classification Search ................. 380/203, 380/217; 713/193; 386/94, 123, 124–126, 386/131
See application file for complete search history.

(56) References Cited

U.S. PATENT DOCUMENTS

| | | | | |
|---|---|---|---|---|
| 5,491,561 A * | 2/1996 | Fukuda | .......................... | 386/123 |
| 5,959,676 A * | 9/1999 | Kondo | ...................... | 348/421.1 |
| 6,519,341 B1 * | 2/2003 | Enari | .......................... | 380/217 |
| 6,614,846 B1 * | 9/2003 | Fujiwara et al. | ......... | 375/240.16 |
| 6,633,725 B2 * | 10/2003 | Hughes et al. | .............. | 386/123 |
| 6,819,765 B1 * | 11/2004 | Kori | ........................... | 380/203 |
| 7,020,195 B1 * | 3/2006 | McMahon | ............. | 375/240.11 |
| 7,519,118 B2 * | 4/2009 | Lin et al. | ............... | 375/240.25 |
| 7,561,783 B2 * | 7/2009 | Comer et al. | ............... | 386/125 |
| 2002/0001385 A1 * | 1/2002 | Kawada et al. | .............. | 380/201 |
| 2003/0128970 A1 * | 7/2003 | Lan et al. | ..................... | 386/112 |
| 2004/0017852 A1 * | 1/2004 | Garrido et al. | ......... | 375/240.16 |

(Continued)

FOREIGN PATENT DOCUMENTS

JP    6-350968    * 12/1994

(Continued)

OTHER PUBLICATIONS

Sakamoto et al., Machine generated translation of JP 08-331543, Dec. 1996.*

*Primary Examiner*—David E Harvey
(74) *Attorney, Agent, or Firm*—Young & Thompson

(57) ABSTRACT

An information record apparatus includes: a down-convert device for down-converting a first content information having a first reproduction quality (HD) into a second content information having a second reproduction quality (SD) which is lower quality than the first reproduction quality; a scramble device for generating scramble information by scrambling the first content information, on the basis of a predetermined scramble key; and a first record device for recording the second content information and the scramble information into a first record medium.

10 Claims, 8 Drawing Sheets

U.S. PATENT DOCUMENTS

| | | | |
|---|---|---|---|
| 2004/0033061 A1* | 2/2004 | Hughes et al. | 386/124 |
| 2005/0086505 A1* | 4/2005 | Ishibashi et al. | 713/193 |
| 2006/0123450 A1* | 6/2006 | Wei et al. | 725/74 |

FOREIGN PATENT DOCUMENTS

| | | | |
|---|---|---|---|
| JP | 08-331543 | * | 12/1996 |
| JP | 09-171658 | | 6/1997 |
| JP | 2000-298926 | | 10/2000 |
| JP | 2000-324443 | | 11/2000 |
| JP | 2003-234999 | * | 8/2003 |

* cited by examiner

SCRAMBLING CONTENT INFORMATION IN A FIRST RECORDING MEDIUM WHEN DOWNGRADING THE QUALITY OF CONTENT INFORMATION FOR STORAGE ON A SECOND RECORDING MEDIUM

BACKGROUND OF THE INVENTION

1. Field of the Invention

The present invention relates to an information record apparatus and method, as well as an information reproduction apparatus and method, such as a DVD recorder or a DVD player. The present invention further relates to a computer program product to make a computer function as such an information record apparatus and the like.

2. Description of the Related Art

At present, terrestrial digital broadcasting, BS digital broadcasting, and the like have been already begun, so that audio-visual environment presenting a high quality digital broadcasting becomes more popular even at home. In such a kind of digital broadcasting, it is possible to enjoy content information having quality of high vision broadcasting (hereinafter referred to as HD (High Definition)) or HDTV, superior to content information having quality of so-called standard broadcasting (hereinafter referred to as SD (Standard Definition)) or SDTV.

On the other hand, since the content information broadcasted by such a kind of digital broadcasting is digital data, the copying of the content information does not tend to deteriorate the image quality. Thereby, the copying is easy. For this reason, the copying of the digital data (or the content information of the digital broadcasting) makes a problem in protecting the copyright. In order to protect the copyright, various approaches for protecting the copyright is on their development, as disclosed in Japanese Patent Application Laid-Open Nos. 2000-324443, 2000-298926 and Hei 9-171658, for example. Particularly, CPPM (Content Protection for Prerecorded Media) or CPRM (Content Protection for Recording Media) employed in a record medium such as the DVD or the like for protecting the copyright is a technology for preventing an illegal or unauthorized copying, in which the copyright of the content may be appropriately protected by putting a "copy once limitation" on the content information.

SUMMARY OF THE INVENTION

The "copy once limitation" has been put on all programs (or content information) broadcasted in Japan from April, 2004, in the terrestrial digital broadcasting and the BS digital broadcasting, in order to protect the copyrights.

This "copy once limitation" allows a so-called "move operation" only in which the original content information recorded in a hard disk or the like is deleted, if the content information recorded in the hard disk is moved into/onto another record medium such as the DVD. For example, some users tend to record HD content information into a hard disk at home and then record this HD content information into a DVD or the like in order to enjoy this content anywhere out of home. In this case, the HD content information recorded in the hard disk is recorded as another SD content information into the DVD or the like and this original HD content information is deleted from the hard disk, in conformity with the move operation. This move operation allows transferring the content information with the "copy once limitation" into/onto another record medium, while suitably protecting the copyright of the content information.

In this case, even if the user wants to enjoy the HD content information again, it is impossible to enjoy the HD content information, because there is remained only the SD content information. Such a situation is inconvenient in that it may prevent a spread of the digital broadcasting, and may detract advantages of information devices such as hard disk recorders.

The present invention has been accomplished in view of the above problems. It is therefore an object of the present invention to provide an information record apparatus and method, an information reproduction as well as apparatus and method, allowing the HD content information and SD content information to be viewed suitably, while suitably protecting the copyright thereof. It is further an object of the present invention to provide a computer program product for making a computer function as such an information record apparatus and the like.

(Information Record Apparatus)

In the present invention, the information record apparatus is provided with: a down-convert device for down-converting a first content information having a first reproduction quality into a second content information having a second reproduction quality which is lower quality than the first reproduction quality; a scramble device for generating scramble information by scrambling the first content information, on the basis of a predetermined scramble key; and a first record device for recording the second content information and the scramble information into a first record medium.

According to the information record apparatus, the first content information having the first reproduction quality (HD) is down-converted into the second content information having the second reproduction quality (SD), by the operation of the down-convert device. In this case, the second reproduction quality is lower quality than the first reproduction quality. In other word, the second reproduction quality is inferior to the first reproduction quality. Thereby the data size of the second content information is smaller than that of the first content information. Then, the generated second content information is recorded into the first record medium, by the operation of the first record device.

Particularly in the present invention, the first content information is scrambled on the basis of the scramble key, by the operation of the scramble device. As a result, the scramble information is generated from the first content information. The term, "the scramble" herein means a processing for converting a certain kind of content information representing a predetermined image or the like into another kind of information (i.e. scramble information) incapable, by itself, of representing such a predetermined image or the like. That is, the scramble information itself does not represent various images, sounds, or the like, but it becomes the information (specifically, the first content information) representing various images, sounds or the like when the data processing with the scramble key is performed to the scramble information. Therefore, insofar as the scramble information is generated, the copyright of the content can be protected suitably. This scramble information is recorded into the first record medium, by the operation of the first record device.

Then, as mentioned later, the first content information can be generated from the scramble information, on the basis of the scramble key. Therefore, the user can enjoy the content information having the first reproduction quality on the basis of the scramble information, even after the first content information having the first reproduction quality is down converted into the second content information having the second reproduction quality, while the copyright of the content is suitably protected. That is, for example, even in the case that a relatively high definition digital broadcasting program is down-converted into a relatively low definition program and then recorded into the first record medium, it is possible to enjoy this program as the relatively high definition program again. Of course, it is possible to enjoy this program as the relatively low definition program.

As a result, according to the information record apparatus, the user can suitably enjoy the content information having desired reproduction quality (e.g. the first reproduction quality corresponding to HD quality as mentioned below, or the second reproduction quality corresponding to SD quality as mentioned below), while the copyright of the content is protected.

In an aspect of the present invention, the information record apparatus is further provided with: a second record device for recording the second content information into a second record medium; and a first delete device for deleting the second content information recorded in the first record medium, if the second content information is recorded into the second record medium.

According to this aspect, the second content information recorded in the first record medium can be recorded into the second record medium, by the operation of the second record device. Furthermore, since there is little need of the data processing (especially, the aforementioned down-convert processing, the below mentioned decode processing, etc.) for the second content information recorded in the first record medium, the second content information can be recorded (e.g. the move operation as mentioned below) into the second record medium relatively quickly. Furthermore, it is possible to perform the recording of the first content information into the first record medium by the operation of the down-convert device, the first record device and the like mentioned above, along with the recording of the second content information from the first record medium to the second record medium. That is, the efficiency of the recording operation can be remarkably improved.

Additionally, once the second content information is recorded into the second record medium, the second content information is deleted from the first record medium by the operation of the first delete device. Therefore, the copyright of the content can be protected.

In another aspect of the present invention, the information record apparatus is further provided with: a key generate device for generating the scramble key, on the basis of at least a part of the second content information.

According to this aspect, for example, it is possible to generate the scramble key inherent to the second content information to be recorded into the first record medium. In other words, in order to newly generate the scramble key, the second content information (or the first record medium into which the second content information is recorded) is actually required for example. For this, illegal or unauthorized generation (copying) of the scramble key can be prevented more effectively. Therefore, even if someone obtains the scramble information illegally or incorrectly, this someone cannot generate the scramble key easily, resulting in the suitable protection of the copyright of the content.

In another aspect of the present invention, the information record apparatus is further provided with: an information generate device for generating the first content information, on the basis of the scramble information and the scramble key, respectively.

According to this aspect, it is possible to generate the higher definition first content information, on the basis of the scramble information and the scramble key. That is, the original first content information can be generated, by descrambling the scramble information on the basis of the scramble key. Therefore, the user can enjoy the first content information again, even after the first content information is down-converted into the second content information and this second content information is recorded into another record medium.

In this aspect of the present invention, the first record device records the generate first content information into the first record medium, and the information record apparatus is further provided with: a second delete device for deleting the second content information recorded in the second record medium, if the generated first content information is recorded into the first record medium.

In this arrangement, the generated first content information is recorded into the first record medium again. And the second content information is deleted from the second record medium by the operation of the second delete device. Therefore, even in the case that the first content information is down-converted into the second content information and then this second content information is recorded into the another record medium, the first content information can be recorded into the original record medium again, while the copyright of the content is suitably protected.

(Information Record Method)

In the present invention, the information record method includes: a down-convert process of down-converting a first content information having a first reproduction quality into a second content information having a second reproduction quality which is lower quality than the first reproduction quality; a scramble process of generating scramble information by scrambling the first content information, on the basis of a predetermined scramble key; and a first record process of recording the second content information and the scramble information into a first record medium.

According to the information record method, various benefits and advantages can be obtained similarly to the case of the information record apparatus as mentioned above.

Incidentally, the information record method of the invention can be embodied in various aspects, similarly to various aspects in the information record apparatus of the invention.

(Information Reproduction Apparatus)

In the present invention, there is presented an information reproduction apparatus for reproducing the second content information, which is recorded at least in the first record medium by the information record apparatus according to the present invention (including various aspects), with desired reproduction quality, the information reproduction apparatus being provided with: an information generate device for generating the first content information, on the basis of the scramble information and the scramble key, respectively; and a first reproduction device for reproducing the generated first content information.

According to the information reproduction apparatus, it is possible to generate the higher definition first content information, on the basis of the scramble information and the scramble key. That is, the original first content information can be generated by descrambling the scramble information on the basis of the scramble key. Therefore, the user can enjoy the first content information again, even after the first content information is down-converted into the second content information and this second content information is recorded into another record medium.

Consequently, according to the information reproduction apparatus, the user can enjoy the content information having desired reproduction quality (especially the first reproduction quality), while the copyright of the content is protected.

In an aspect of the present invention, the information reproduction apparatus is further provided with: a second reproduction device for reproducing the second content information.

According to this aspect, the user can enjoy suitably the second content information also.

(Information Reproduction Method)

In the present invention, there is presented an information reproduction method of reproducing the second content information, which is recorded at least in the first record medium by the information record apparatus according to the present invention (including various aspects), with desired reproduction quality, the information reproduction method including: an information generate process of generating the first content information, on the basis of the scramble information and the scramble key, respectively; and a first reproduction process of reproducing the generated first content information.

According to the information reproduction method, various benefits and advantages can be obtained similarly to the case of the information reproduction apparatus as mentioned above.

Incidentally, the information reproduction method of the invention can be embodied in various aspects, similarly to various aspects in the information reproduction apparatus of the invention.

(Computer Program Product)

In present invention, there is presented a computer program product in a computer-readable medium for tangibly embodying a program of instructions executable by a computer to make the computer function as at least one of the down-convert device, the scramble device and the first record device of the information record apparatus according to the present invention as mentioned above (including various aspects).

In the present invention, there is presented a computer program product in a computer-readable medium for tangibly embodying a program of instructions executable by a computer to make the computer function as at least one of the information generate device and the first reproduction device of the information reproduction apparatus according to the present invention as mentioned above (including various aspects).

According to the computer program products, the information record apparatus and the information reproduction apparatus may be embodied relatively easily, by reading and running the computer program product from a record medium, such as a ROM, a CD-ROM, a DVD-ROM, a hard disk and so on, storing the computer program therein/thereon, or by downloading the computer program product to the computer via the communication device and running it.

Incidentally, the computer program product of the invention can be embodied in various aspects, similarly to various aspects in the information record apparatus or the information reproduction apparatus of the invention.

The nature, utility, and further features of this invention will be more clearly apparent from the following detailed description with reference to preferred embodiments of the invention when read in conjunction with the accompanying drawings briefly described below.

As discussed above, the information record apparatus or method according to the present invention is provided with the down-convert device, the scramble device and the first record device, otherwise the down-convert process, the scramble process and the first record process. Furthermore, the information reproduction apparatus or method according to the present invention is provided with the information generate device and the first reproduction device, otherwise the information generate process and the first reproduction process. Therefore, the user can enjoy the content information having desired reproduction quality, while the copyright of the content is protected.

DETAILED DESCRIPTION OF THE PREFERRED EMBODIMENTS

Now, exemplary embodiments of the present invention are discussed, with reference to drawings.

(Fundamental Structure)

Figure 1:
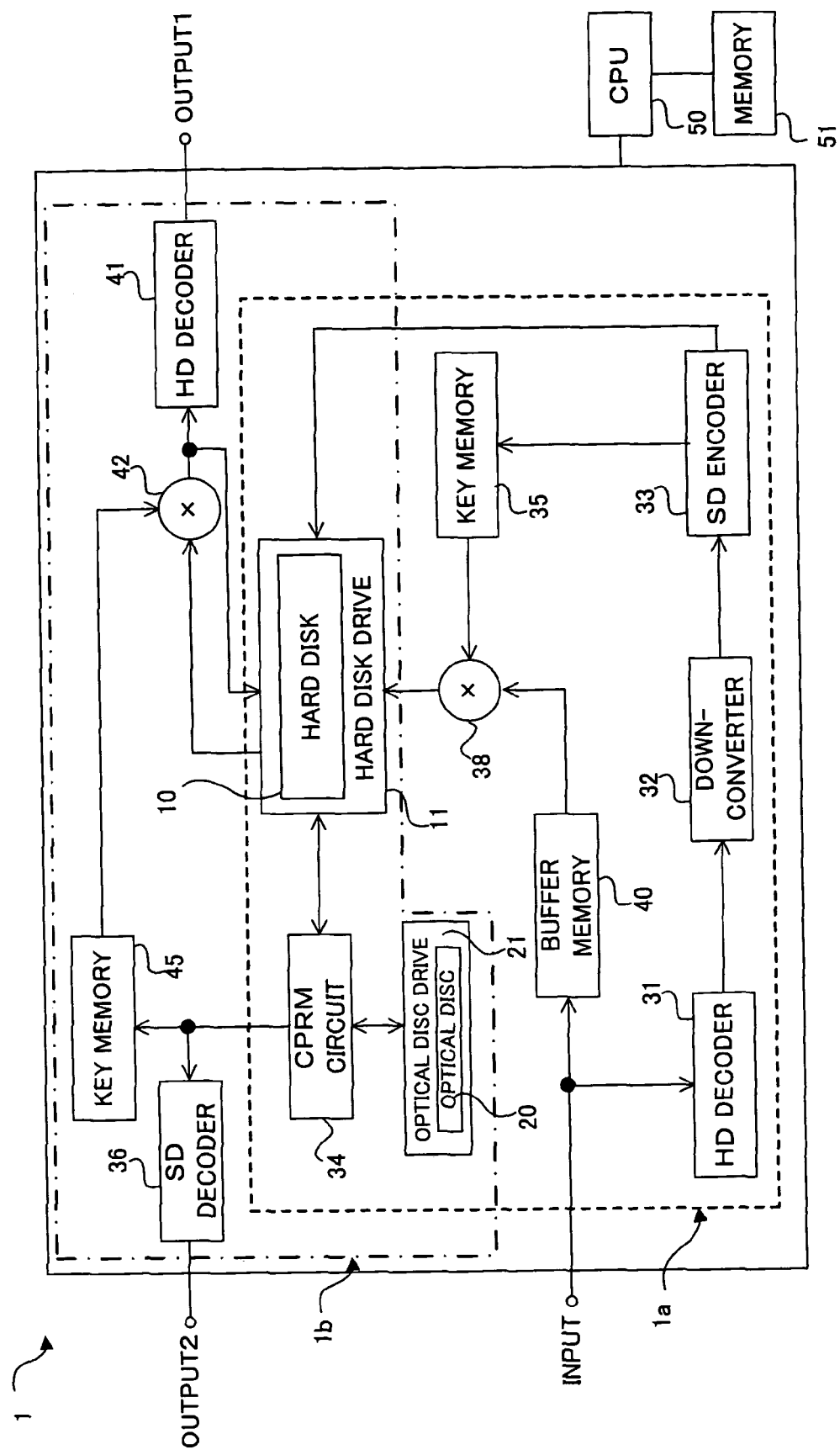
FIG. 1 is a block diagram conceptually showing a fundamental structure in an embodiment of the information record reproduction apparatus according to the present invention.

Firstly, an explanation is made on an exemplary fundamental structure of the embodiment of the information record reproduction apparatus as the embodiments of the information record apparatus and the information reproduction apparatus according to the present invention, with reference to FIG. 1. FIG. 1 conceptually shows the exemplary fundamental structure of the information record reproduction apparatus in a block diagram.

As shown in FIG. 1, the information record reproduction apparatus 1 is constructed to record data into a hard disk 10 and an optical disc 20, respectively. The information record reproduction apparatus 1 is provided with: a hard disk drive 11; an optical disc drive 21; an HD (High Definition) decoder 31; a down-converter 32; an SD (Standard Definition)

encoder 33; a CPRM (Content Protection for Recordable Media) circuit 34; a key memory 35 (45); an SD decoder 36; a scramble circuit 38; a buffer memory 40; an HD decoder 41; a descramble circuit 42; a CPU 50; and a memory 51.

The hard disk 10, which is a specific example of "the first record medium" according to the present invention, is a magnetic record medium capable of recording various kinds of data. Especially, the hard disk has a larger volume of record capacity than that of the optical disc 20.

The hard disk drive 11, which is a specific example of "the first record device" or "the first delete device" according to the present invention, is adapted to record various kinds of data into the hard disk 10 or to delete various kinds of data from the hard disk 10.

The optical disc 20, which is a specific example of "the second record medium" according to the present invention, may be an information record medium in a disc-like form having 12 cm diameter such as a DVD.

In particular, the optical disc 20 used for this embodiment of the information record reproduction apparatus 1 is a re-writable optical disc (e.g. a DVD-RW etc.) in conformity with CPRM.

The optical disc drive 21, which is a specific example of "the second record device" or "the second delete device" according to the present invention, is adapted to record various kinds of data into the optical disc 20 or to delete various kinds of data from the optical disc 20.

The HD decoders 31 and 41 are adapted to decode HD stream. That is, they are adapted to generate data of HD quality image as a specific example of "the first content information" according to the present invention by decoding HD stream compressed (or encoded) in a MPEG2 format.

Incidentally, this embodiment has two HD decoders. Nevertheless, an embodiment having only one HD decoder is feasible.

The down-converter 32, which is a specific example of "the down-convert device" according to the present invention, is adapted to convert data of a HD size image (1920×1080 pixels) into data of a SD size image (720×480 pixels).

Incidentally, in this embodiment, in order to distinguish images from view point of their pixel quantity, terms "HD size image" and "SD size image" are used as seen in the above paragraph. On the other hand, an image having pixels as many as the HD size image and actually presenting HD image quality is especially referred to as an HD quality image. Furthermore, an image having pixels as many as the SD size image cannot naturally present HD image quality. Therefore, the SD size image may be referred to as an SD quality image as appropriate.

The SD encoder 33 is adapted to compress (or encode) the data of SD size image converted by the down-converter 32 in MPEG2 format. After this MPEG2 compression, SD stream is obtained.

The CPRM circuit 34 encrypts or decrypts various kinds of data (or streams) recorded or to be recorded into the optical disc 20, in conformity with CPRM, for the copy protection.

The key memory 35 (45) is adapted to store a scramble key used for a scramble process of an HD stream or a descramble process of scramble data.

Incidentally, this scramble key will be mentioned later in detail (see FIG. 3).

The SD decoder 36 is adapted to decode the SD streams. That is, it is adapted to generate data of SD size image (i.e. data of SD quality image) as a specific example of "the second content information" according to the present invention by decoding SD stream compressed (or encoded) in MPEG2 format.

The buffer memory 40, which includes a semiconductor memory such as a RAM (Random Access Memory), is adapted to temporarily store the HD stream inputted via the input terminal. Furthermore, it is adapted to output the stored HD stream to the scramble circuit 38 in a predetermined timing (e.g. in accordance with a timing of being inputted the scramble key into the scramble circuit 38).

The scramble circuit 38, which is a specific example of "the scramble device" according to the present invention, scrambles HD streams read from the buffer memory 40, on the basis of the scramble key outputted from the key memory 35. As a result, it can generate the scramble data.

The descramble circuit 42, which is a specific example of "the information generate device" according to the present invention, descrambles the scramble data read from the hard disk 10, on the basis of the scramble key outputted from the key memory 35. That is, the scramble data is subjected to a data processing inverted to the aforementioned scramble processing. As a result, HD stream can be generated.

The CPU 50 is adapted to control an entire operation of the information record reproduction apparatus 1 (i.e. various components enclosed within an outer frame of solid line in FIG. 1). That is, the CPU outputs system commands to each component of the information record reproduction apparatus 1 in order to control the entire information record reproduction apparatus 1. Software for operating the CPU 50 is usually stored in an external memory, for example.

The memory 51 includes a semi-conductor memory such as RAM (Random Access Memory) or flash memory for temporarily and recordably storing various kinds of data required for the operation of the apparatus 1.

Incidentally, from among various kinds of component in the information record reproduction apparatus 1, components enclosed within a short dashed line 1a in FIG. 1 (i.e. the hard disk drive 11, the optical disc drive 21, the HD decoder 31, the down-converter 32, the SD encoder 33, the CPRM circuit 34, the key memory 35, the scramble circuit 38 and others) mainly constructs a specific example of the information record apparatus according to the present invention. On the other hand, components enclosed within an alternate long dashed and dotted line 1b in FIG. 1 (i.e. the hard disk drive 11, the optical disc drive 21, the CPRM circuit 34, the key memory 45, the SD decoder 36, the HD decoder 41, the descramble circuit 42 and others) mainly constructs a specific example of the information reproduction apparatus according to the present invention.

Furthermore, it should be noted that a data-bus for intervening various components is partially omitted in this block diagram for the simplicity. For example, if a HD stream is recorded in the hard disk 10, this HD stream is outputted to the HD decoder 31 or 41 via a part of data-bus (not shown), so that the HD quality image is reproduced.

Furthermore, arrow shaped marks depicted on the data-bus illustrates directions of data IO (Input and Output) as only an example. Those skilled in the art will understand that directions of data IO are not limited to this example.

(Operational Principle)

Now, an explanation is made on the operational principle of this embodiment of the information record reproduction apparatus, with reference to FIG. 2 to FIG. 12.

(1) Data Recording into/onto Hard Disk

Figure 2:
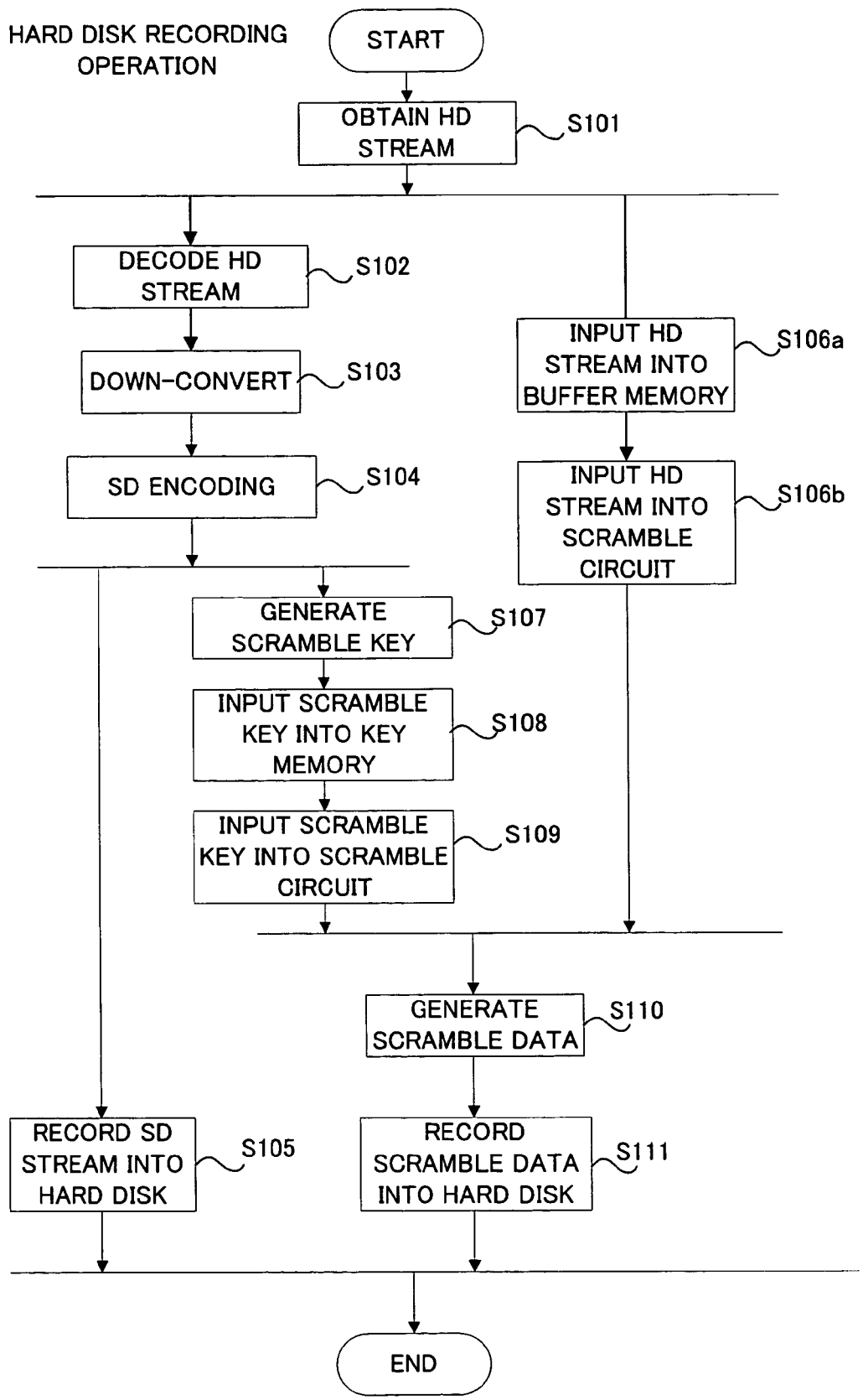
FIG. 2 is a flow chart conceptually showing a data recording operation into the hard disk in the embodiment of the information record reproduction apparatus.
Figure 3:
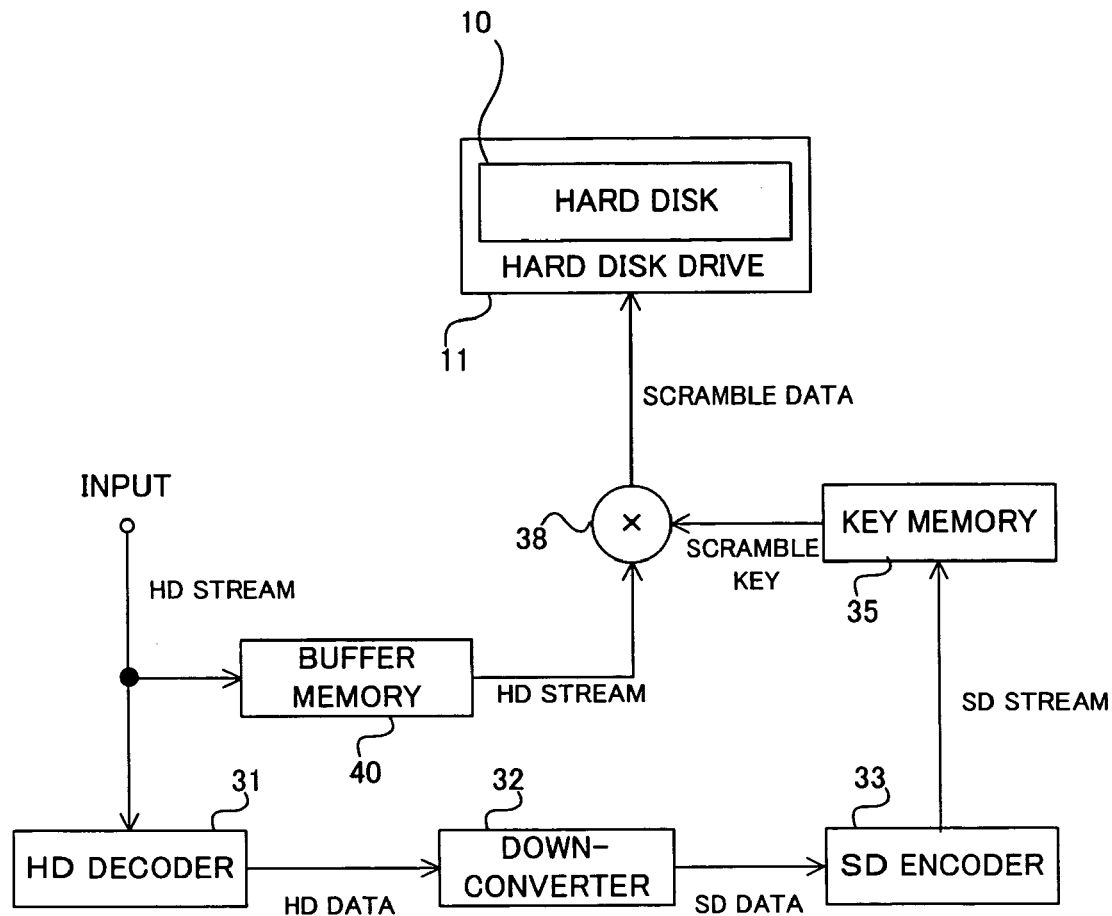
FIG. 3 is a block diagram showing components for the data recording operation into the hard disk.
Figure 4:
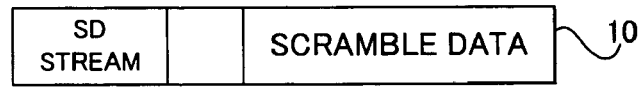
FIG. 4 is a diagram conceptually showing a status of data recorded into a hard disk, during the data recording operation into the hard disk.

Firstly, an explanation is made on a data recording into/onto the hard disk 10, in this embodiment of the information record reproduction apparatus 1, with reference to FIG. 2 to FIG. 4. FIG. 2 is a flow chart conceptually showing a flow of the data recording into/onto the hard disk 10. FIG. 3 shows some components for the data recording into/onto the hard disk 10 in a block diagram. FIG. 4 conceptually shows data recorded into the hard disk 10, during the operation relative to the hard disk 10.

As shown in FIG. 2, the information record reproduction apparatus 1 firstly obtains data of an HD quality image and compressed in conformity with MPEG2 (i.e. HD stream) (step S101). For example, broadcasting signal (i.e. HD stream) relating to the HD quality image is obtained from a digital broadcasting tuner connected to the input terminal.

Then, the obtained HD stream is decoded by the operation of the HD decoder 31 (step S102). This decoding generates data of HD quality image before the MPEG2 compression (hereinafter referred to as "HD data" as appropriate).

Then, the decoded HD data is inputted to the down-converter 32. Then, the HD data is converted into another data of SD size image (hereinafter referred to as "SD data" as appropriate) by the operation of the down-converter 32 (step S103).

Then, the SD data is inputted to the SD encoder 33. Then, a SD encoding (i.e. MPEG2 compression) process is performed to the inputted SD data by the operation of the SD encoder 33 (step S104). As a result, a SD stream is generated.

Then, the encoded SD stream is recorded into the hard disk 10 (step S105).

At this timing, the HD stream is down-converted and then recorded into the hard disk 10, so that the HD stream (i.e. the HD quality image) cannot be reproduced as it is. Therefore, the following operation is performed, along with the recording operation of the SD stream into the hard disk 10, which is already explained with reference to until step S105.

Specifically, the HD stream obtained at step S101 is also inputted into the buffer memory 40 (step S106a). Then, it is inputted into the scramble circuit 38 (step S106b), in a predetermined timing (i.e. in accordance with a timing of the generation of the scramble key to be inputted into the scramble circuit 38, or that of the input of the scramble key into the scramble circuit 38).

Furthermore, a scramble key for the scramble process is generated, under control of the CPU 50 as a specific example of "the key generate device" according to the present invention, on the basis of the SD data encoded at step S104 (i.e. the SD stream generated by the operation of the SD encoder 33) (step S107).

Now, the scramble key is explained specifically. The scramble key is preferably generated on the basis of the SD stream to be recorded into the hard disk 10. For example, the scramble key may be SD stream data (e.g. data for each frame) corresponding to a reproduction time point of the HD stream to be inputted into the scramble circuit 38. Alternatively, the scramble key may be at least a part of the SD stream. Furthermore, the scramble key having a data size smaller than that of the HD stream may be used repeatedly to perform the scramble process, which is mentioned below. Furthermore, since the SD stream (or a part thereof) is used as the scramble key, the SD stream (or the hard disk 10 in/on which the SD stream is recorded) is actually required for the descramble process as mentioned below.

Of course, a predetermined kind of data other than the above examples may be used as the scramble key. Nevertheless, it is preferable to use the above examples as the scramble key.

Incidentally, in an SSL (Secure Socket Layer) which may be used for encrypting data when the data is transferred (transmitted/received) on the network, a key of 128 bits in size is used to encrypt the data. Nevertheless, in this embodiment, it is preferable to perform the scramble process with the scramble key of more than 128 bits in size. For example, as mentioned above, the scramble process may be performed with the scramble key having a size as large as a data amount of one frame.

Then, the generated scramble key is inputted to the key memory 35 (step S108). Then, the scramble key is inputted to the scramble circuit 38 (step S109).

Then, on the basis of the scramble key inputted at step S109, the HD stream inputted at step S106 is scrambled by the operation of the scramble circuit 38. As a result, the scramble data is generated (step S110).

Here, the HD stream corresponding to the scramble key may be read from the buffer memory 40 and inputted into the scramble circuit 38 in accordance with the timing of generating the scramble key, so that the scramble data is generated. Alternatively, the HD stream corresponding to the scramble key (or a part of the HD stream to be scrambled with the scramble key) may be inputted to the scramble circuit 38, while adjusting the timing for outputting the scramble key to the scramble circuit 38 in accordance with the timing for inputting the HD stream to the scramble circuit 38. In this case, the adjusting of the timing is performed in the key memory 35.

In the scramble circuit 38, the scramble data may be generated by performing a logical operation such as a calculation for an exclusive-OR of the scramble key and the HD stream. Alternatively, the scramble data may be generated by performing a predetermined operation (e.g. a shift operation etc.) for the HD stream data, on the basis of the scramble key. In other words, it is desirable to generate the scramble data which does not present any meaningful image or sound by itself until when descrambled with the scramble key, and after this descrambling, presents some meaningful image or sound. That is, "the scramble process" in this embodiment means a process of converting a kind of data presenting a predetermined image or the like into another kind of data presenting no predetermined image or the like by itself Then, the scramble data is recorded into the hard disk 10 (step S111).

FIG. 3 is an extraction of the block diagram of FIG. 1, in which components for actually performing the data recording operation into the hard disk 10 are depicted. That is, the data recording into/onto the hard disk 10 as mentioned above is performed mainly by the operation of hard disk drive 11, the HD decoder 31, the down-converter 32, the SD encoder 33, the key memory 35, the scramble circuit 38 and the buffer memory 40. Furthermore in FIG. 3, there are also shown names of various kinds of data each inputted or outputted among these components.

Conclusively, the HD stream obtained by the information record reproduction apparatus 1 is down-converted into the SD stream and this SD stream is recorded into the hard disk 10. Furthermore, the scramble data is recorded into the hard disk 10. An explanation is made on various statuses of data recorded in the hard disk 10, with reference to FIG. 4.

As shown in FIG. 4, when the recording operation as mentioned above is completed (i.e. all SD streams are recorded into the hard disk 10), the scramble data in addition to the SD stream is recorded in the hard disk 10.

Incidentally, in the aforementioned embodiment, it is preferable that the HD stream is sequentially obtained, and the operation from step S101 to step S111 is sequentially performed to the obtained HD stream. That is, there is no need to obtain the whole HD stream relating to one contents and to perform the operation from step S101 to step S111 to the whole HD stream at one time, but it is sufficient to obtain sequentially a part of the HD stream within a manageable size of the information record reproduction apparatus 1 (e.g.

within a unit of few frames), for the aforementioned data recording operation relative to the hard disk 10. Alternatively, the data recording operation relative to the hard disk 10 is performed in real time in accordance with the timing for receiving the program of the digital broadcasting.

(2) Move Operation

Figure 5:
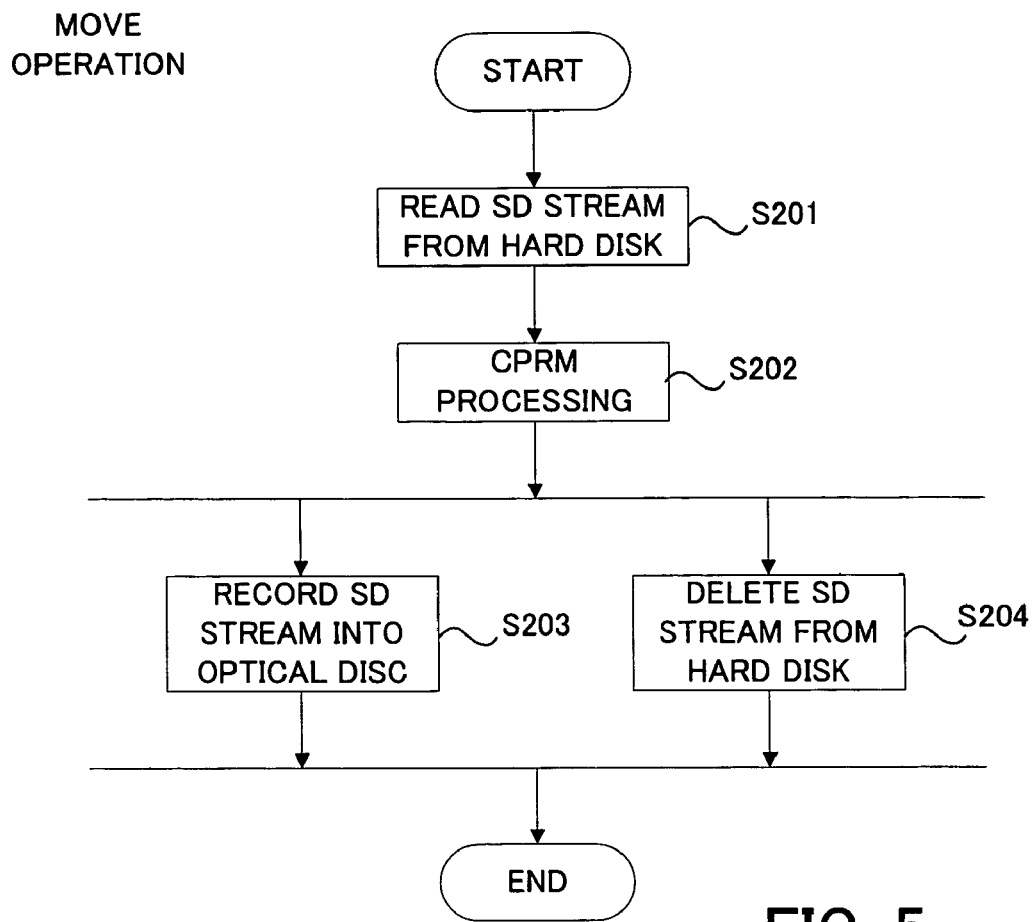
FIG. 5 is a flow chart conceptually showing the move operation of the information record reproduction apparatus in this embodiment.
Figure 6:
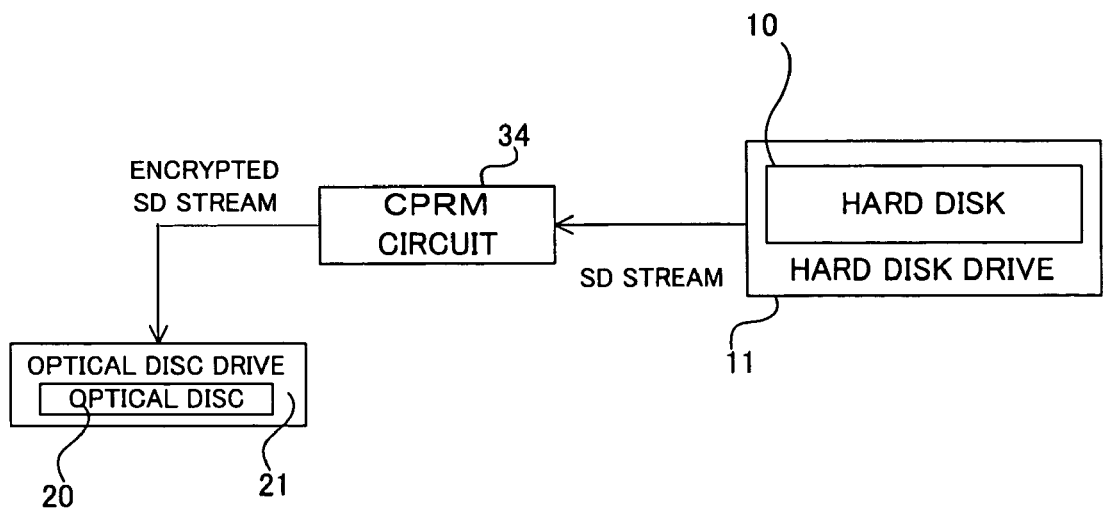
FIG. 6 is a block diagram showing components for the move operation from among components of the information record apparatus in this embodiment.

Now, an explanation is made on the move operation of the information record reproduction apparatus in this embodiment, with reference to FIG. 5 and FIG. 6. FIG. 5 is a flow chart conceptually showing the move operation. FIG. 6 shows a part of components for the move operation.

As shown in FIG. 5, the SD stream is firstly read from the hard disk 10 (step S201). Then, the CPRM process is performed to the read SD stream (step S202). Specifically in this case, an encryption key is generated depending on a device key of the information record reproduction apparatus 1, a media key (e.g. MKB (Media Key Block)) pre-recorded in the optical disc 20, an ID number inherent to the optical disc 20, and so on. Then, the content to be recorded (the SD stream in this case) is encrypted on the basis of this encryption key.

Then, the SD stream is recorded into the optical disc 20 (step S203). Along with this, the SD stream is deleted from the hard disk 10 (step S204).

In this case, the move operation is performed in such a manner that the SD stream on the hard disk 10 corresponding to the SD stream to be recorded into the optical disc 20 is deleted while the SD stream is recorded into the optical disc 20. For example, the SD stream is recorded into the optical disc 20 and the SD stream is deleted from the hard disk 10, by a reproduction time unit of 1 minute (or a few minutes, or a few seconds). However, not limited to these manner and sequential order, the recording of the SD stream into the optical disc 20 and the deleting of the SD stream from the hard disk 10 may be performed in any manner and any sequential order, insofar as the copyright of the content is suitably protected when the user uses the optical disc 20 or the hard disk 10.

Thereby, the user can move the SD stream recorded in the hard disk 10 into the optical disc 20 relatively quickly. In other words, the user can perform the move operation relatively quickly. This is due to the following reason. The digital broadcasting content or the like is recorded as the SD stream in the hard disk 10 and thereby only the CPRM processing is required in order to record the SD stream into the optical disc 20. That is, since the content is not recorded as the HD stream in the hard disk 10, there is no need for the information record reproduction apparatus 1 to generate the scramble data, or perform various data processings including the encoding, the decoding or the down-converting of the HD stream, for the move operation. Thereby, the relatively quick move operation is achieved.

Additionally, in the move operation, it is sufficient to use the CPRM circuit 34 of the information record reproduction apparatus 1. Thereby, while performing the move operation, it is possible to record another HD stream or the SD stream down-converted from the HD stream into the hard disk 10 by means of various encoders and decoders, down-converters or the like, which are not used in the move operation. Therefore, it is possible to perform the recording operation more efficiently and provide a very convenient information record reproduction apparatus 1 to the user.

FIG. 6 is an extraction of the block diagram of FIG. 1, in which components for actually performing the move operation are depicted. That is, mainly by the operation of the hard disk drive 11, the optical disc drive 21 and the CPRM circuit 34, the aforementioned move operation is performed. Incidentally, in FIG. 6, there are also shown names of various kinds of data inputted and outputted among components.

(3) Reproduction Operation of HD Quality Image after Move Operation, and Move Back Operation (HD)

Figure 7:
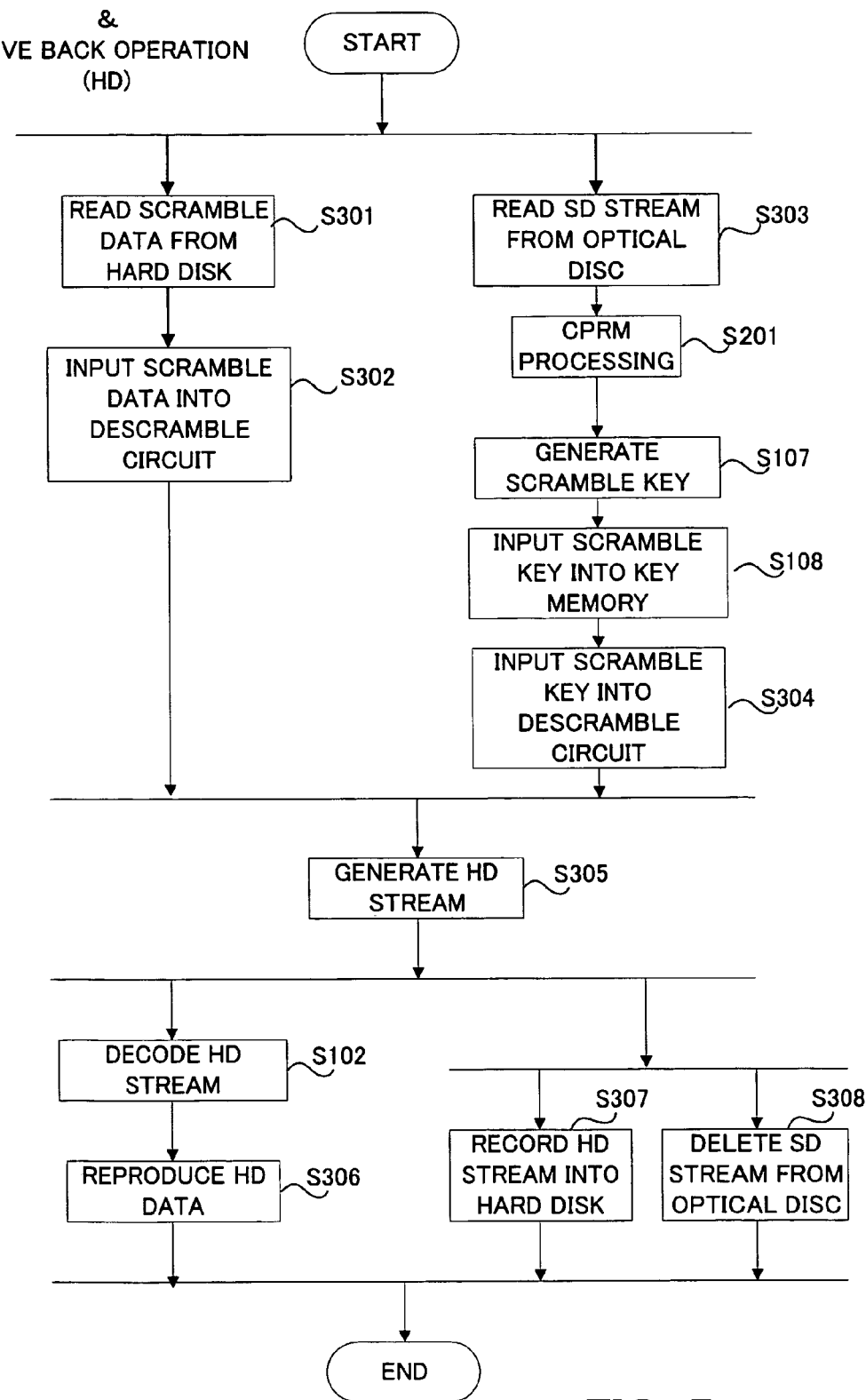
FIG. 7 is a flow chart conceptually showing a reproduction operation of an HD quality image after the move operation, as well as a move back operation (HD), in the embodiment of the information record reproduction apparatus.
Figure 8:
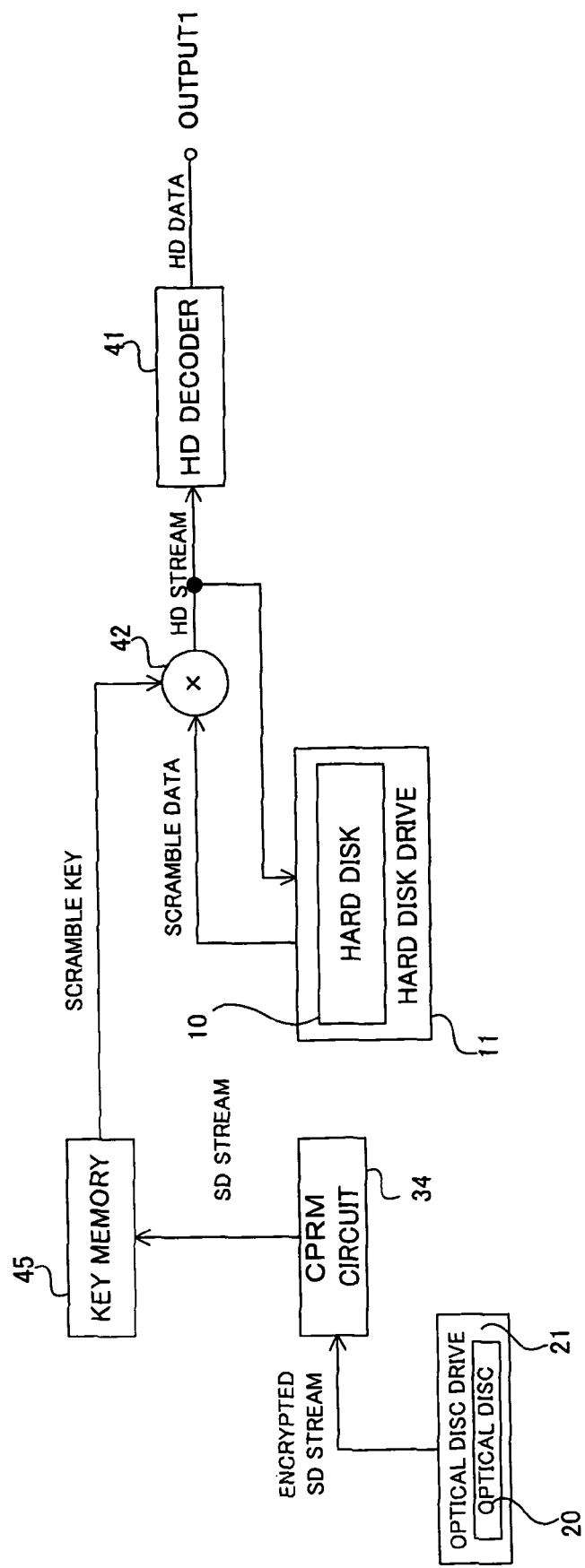
FIG. 8 is a block diagram showing components for the reproduction operation of the HD quality image after the move operation, as well as the move back operation (HD).

Now, an explanation is made on the reproduction operation of the HD quality image after the move operation and the move back operation (HD), with reference to FIG. 7 and FIG. 8. FIG. 7 is a flow chart conceptually showing the reproduction operation of the HD quality image after the move operation, and the move back operation (HD). FIG. 8 shows a part of components for the reproduction operation of the HD quality image after the move operation, as well as the move back operation (HD), in a block diagram.

Incidentally, the "move back operation" means an operation for recording the data after the move operation into the original record medium. Specifically, after the move operation is performed so that the data recorded in a record medium (original medium) is recorded into another record medium, the data recorded in the another record medium is recorded again in the original medium. This operation is referred to as the move back operation. Especially, the operation of recording the data into the original medium as the HD stream is referred to as the move back operation (HD), in order to distinguish from the operation of recording the data into the original medium as the SD stream, which is referred to as the move back operation (SD).

As shown in FIG. 7, the SD stream is firstly read from the optical disc 20 (step S303). Then, the CPRM process is performed to the read SD stream (step S201). Specifically in this case, a decryption key to decrypt the encrypted data is generated depending on the device key of the information record reproduction apparatus 1, the media key pre-recorded in the optical disc 20 or the like. Then, the encryption of the SD stream is decrypted with this decryption key.

Then, under control of the CPU 50, the scramble key is generated from the SD stream (step S107). The same scramble key is generated in the same manner as in the scramble key generate process during the data recording operation relative to the hard disk 10.

Then, the generated scramble key is inputted into the key memory 45 (step S108), and then is inputted to the descramble circuit 42 (step S304).

Along with these steps, the scramble data is read from the hard disk 10 (step S301). Then, the read scramble data is inputted into the descramble circuit 42 (step S302). In this case, the scramble data may be inputted into the descramble circuit 42 in accordance with a timing of generating the scramble key at step S107 (or a timing of inputting the scramble key into the descramble circuit 42). Alternatively, the scramble key may be inputted into the scramble circuit 42 in accordance with a timing of inputting the scramble data into the descramble circuit 42.

Then, the scramble data inputted at step S302 is descrambled, on the basis of the scramble key inputted at step S304, by the operation of the descramble circuit 42. As a result, the HD stream is generated (step S305). That is, the HD stream is generated by performing an inverse operation of that of generating the scramble data in the scramble circuit 38 as mentioned above. In this case, it is preferable to input the scramble data into the descramble circuit 42, synchronously with the corresponding scramble key by a frame unit (i.e. frame by frame). For example, during the move operation as mentioned above, as user data (or additional data) of the SD stream, a head offset address of the corresponding scramble data on the hard disk 10 may be recorded, or a table including therein the head offset address may be recorded on the hard disk 10.

Then, the generated HD stream is decoded by the operation of the HD decoder 41 (step S102). Thereby, the HD data is generated. Then, the generated HD data is reproduced (step S306), so that the user can view the HD quality image.

If the information record reproduction apparatus does not generate the scramble data as in the case of the conventional hard disk recorder or the like, it is impossible or difficult to reproduce the SD stream as the HD quality image, after recording the SD stream, which is down-converted from the HD stream, into the hard disk 10 or the optical disc 20. Furthermore, up-converting the SD data makes it possible to reproduce the SD data as the HD size image having pixels as many as the HD data, but it is hardly makes it possible to reproduce the SD data as the image having the HD quality.

According to the embodiment of the information record reproduction apparatus 1, however, even after the HD stream is converted into the SD stream and then recorded into the hard disk 10 or the optical disc 20, it is possible to reproduce the HD quality image again by performing the reproduction operation with the scramble data as mentioned above. Furthermore, even if the HD stream is converted into the SD stream and then recorded into the hard disk 10 or the optical disc 20, only the scramble data which is quite different from the original HD stream is recorded in the hard disk 10, so that the copyright of the contents is suitably protected.

Therefore, at home or the like, the user can enjoy high quality images on a wide screen such as a plasma television or a projector, by reproducing the HD stream recorded in a high-end information record reproduction apparatus such as a hard disk recorder. On the other hand, the HD stream may be converted into the SD stream and then recorded into the optical disc 20 such as a DVD, so that the use can enjoy the same contents even in a car with the aid of a DVD player mounted on the car (or a DVD player mounted on a car navigation system). That is, the great advantage can be presented in that the user can enjoy any desired content with any desired quality, both at home where the high-end AV environment may be obtained and in a car where a simple AV environment may be obtained.

On the other hand, in addition to or instead of the aforementioned reproduction of the HD data, the HD stream generated in the descramble circuit 42 may be recorded into the hard disk 10 (step S307). That is, the move back operation (HD) may be performed.

Along with this recording operation of the HD stream, the SD stream recorded in the optical disc 20 is deleted (step S308). Thereby, the copyright of the contents can be protected. The user can enjoy the HD quality image recorded again on the hard disk.

In this case, it is preferable to delete the scramble data recorded in the hard disk 10. Thereby, it is possible to utilize the record capacity of the hard disk 10, more effectively.

FIG. 8 is an extraction of the block diagram of FIG. 1 in which components to actually perform the reproduction operation of the HD quality image after the move operation and the move back operation (HD) are depicted. That is, mainly by the operation of the hard disk drive 11, the optical disc drive 21, the CPRM circuit 34, the key memory 45, the HD decoder 41 and the descramble circuit 42, the reproduction operation of the HD quality image after the move operation is performed as well as the move back operation (HD). Then, outputting the HD data to an external output device (e.g. various kinds of display or various kinds of audio device, etc.) connected to the output 1 allows the user to enjoy the HD quality image. Incidentally, in FIG. 8, there are also shown names of various kinds of data inputted and outputted among components.

(4) Reproduction Operation of SD Quality Image after Move Operation and Move Back Operation (SD)

Figure 9:
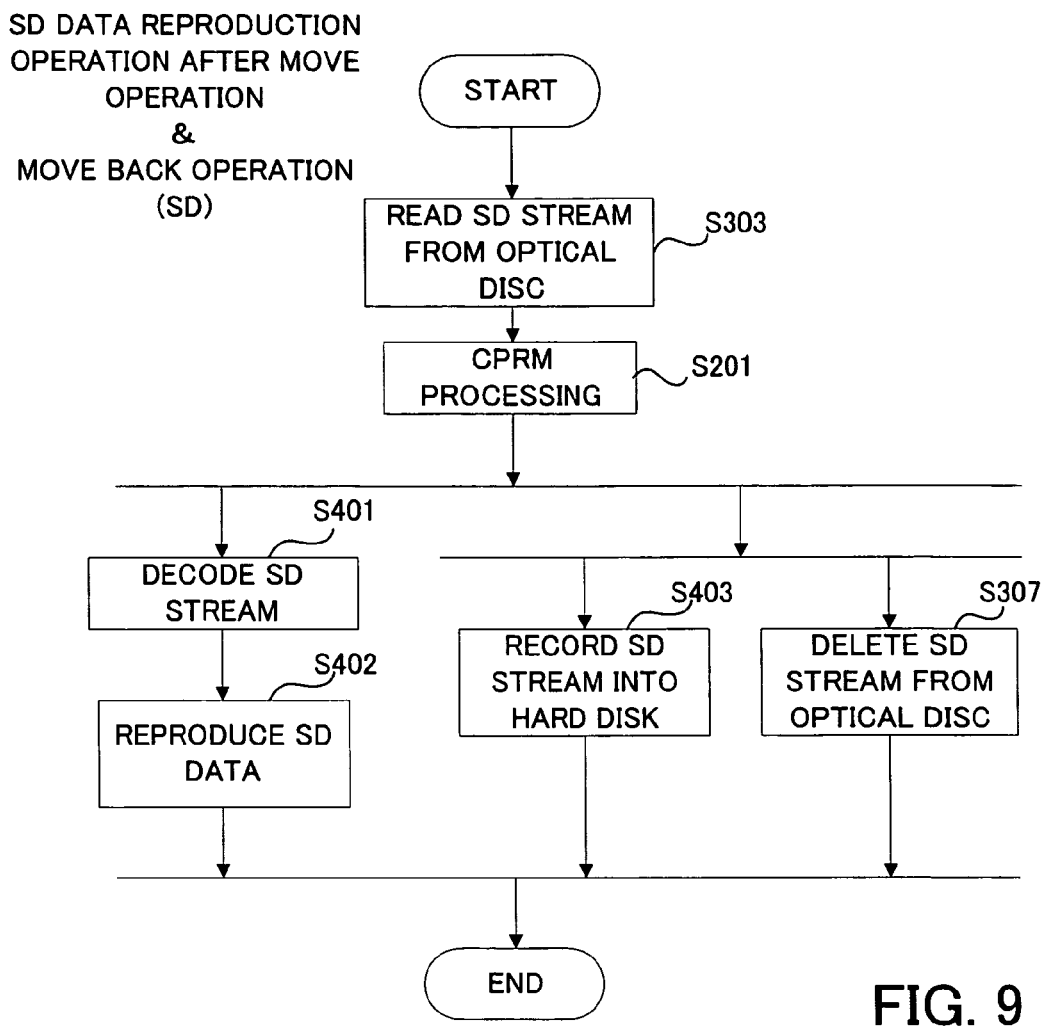
FIG. 9 is a flow chart conceptually showing the reproduction operation of the SD quality image after the move operation, as well as the move back operation (SD).
Figure 10:
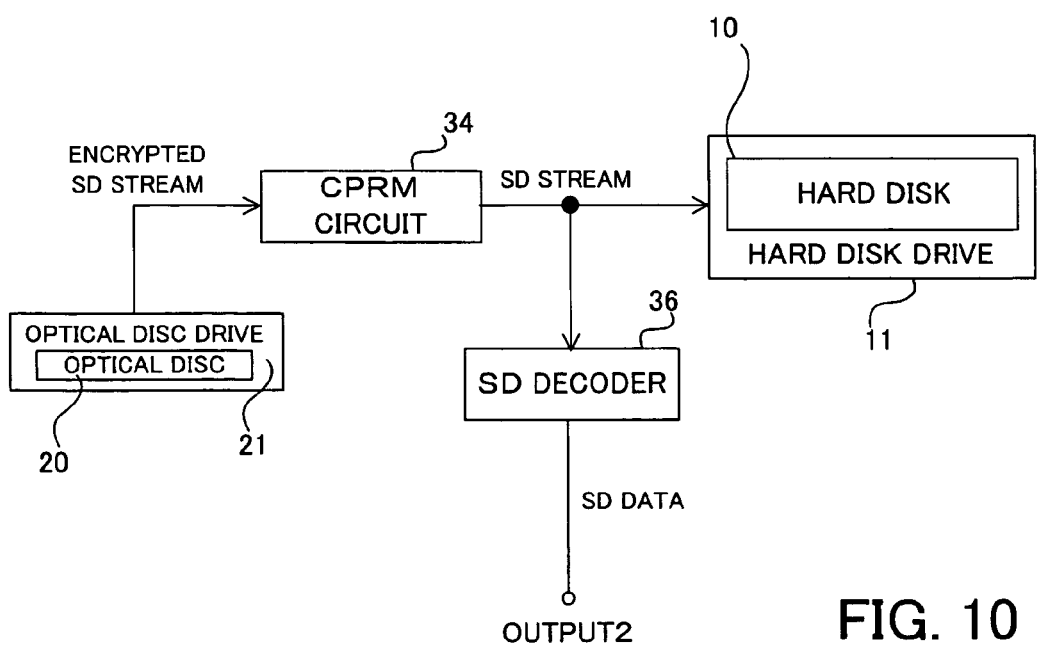
FIG. 10 is a block diagram showing components for the reproduction operation of the SD quality image after the move operation, as well as the move back operation (SD).

Now, an explanation is made on the reproduction operation of the SD quality image after the move operation, as well as the move back operation (SD), with reference to FIG. 9 and FIG. 10. FIG. 9 is a flow chart conceptually showing the reproduction operation of the SD quality image after the move operation, as well as the move back operation (SD). FIG. 10 shows a part of components for the reproduction operation of the SD quality image after the move operation, as well as the move back operation (SD), in a block diagram.

As shown in FIG. 9, the SD stream is firstly read from the optical disc 20 (step S303). Then, the CPRM process is performed to the read SD data (step S201). Specifically in this case, the decryption key is generated to decrypt the encrypted data, depending on the device key of the information record reproduction apparatus 1, the media key pre-recorded in the optical disc 20, or others. Then, the encryption of the SD stream is decrypted with the aid of this decryption key.

The SD stream whose encryption is decrypted is decoded, by the operation of the SD decoder 36 (step S401) to generate the SD data. Then, reproducing the generated SD data (step S402) allows the user to enjoy the SD size image (i.e. SD quality image).

On the other hand, instead of or in addition to the aforementioned reproduction of the SD data, the SD stream whose encryption is decrypted may be recorded into the hard disk 10 (step S403). That is, the move back operation (SD) may be performed.

Along with this recording operation of the SD stream, the SD stream recorded in the optical disc 20 is deleted (step S307). Thereby, the copyright of the contents can be protected. Then, the SD stream read from the hard disk 10 is decoded, so that the SD quality image is reproduced.

In this case, it is preferable to remain the scramble data recorded in the hard disk 10 as it is, for the later reproduction of the HD data.

Thus, it is possible to record the SD stream into the hard disk 10 again, while the copyright of the content is suitably protected.

FIG. 10 is an extraction of the block diagram of FIG. 1, in which components for actually performing the reproduction operation of the SD quality image after the move operation, as well as the move back operation (SD), are depicted. That is, mainly by the operation of the hard disk drive 11, the optical disc drive 21, the CPRM circuit 34 and the SD decoder 36, the aforementioned reproduction operation of the SD quality image after the move operation, as well as the move back operation (SD), are performed. Then, outputting the SD data to an external output device (e.g. various kinds of display or various kinds of audio devices) connected to the output 2 allows the user to enjoy the SD quality image. Incidentally, in FIG. 10, there are also shown names of various kinds of data inputted and outputted among components.

(5) Reproduction Operation of HD Quality Image after Move Back Operation (HD)

Figure 11:
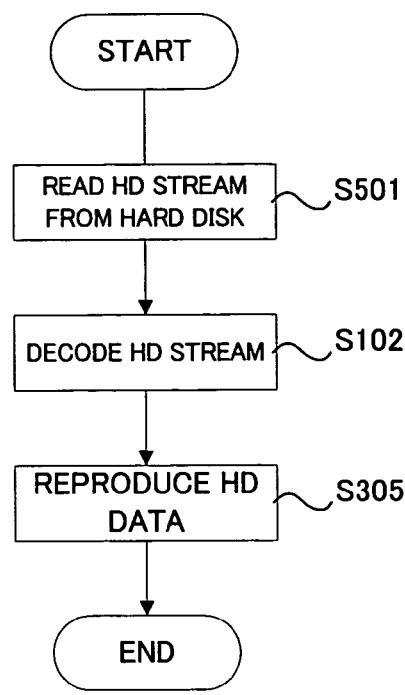
FIG. 11 is a flow chart conceptually showing the reproduction operation of the HD quality image after the move back operation (HD) in the embodiment of the information record reproduction apparatus.
Figure 12:
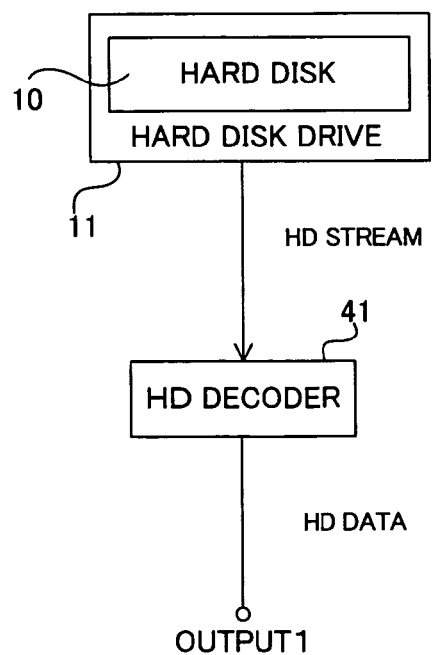
FIG. 12 is a block diagram showing components for the reproduction operation of the HD quality image after the move back operation (HD) in the embodiment of the information record reproduction apparatus.

Now, an explanation is made on the reproduction operation of the HD quality image after the move back operation (HD), with reference to FIG. 11 and FIG. 12. FIG. 11 is a flow chart conceptually showing the reproduction operation of the HD quality image after the move back operation (HD). FIG. 12 shows a part of components relating to the reproduction operation of the HD quality image after the move back operation (HD), in a block diagram.

As shown in FIG. 11, the HD stream is read from the hard disk 10 (step S501). The read HD stream is decoded (step S102). That is, the HD data is generated. Then, reproducing the generated HD data (step S305) allows the user to enjoy the HD quality image.

Incidentally, the reproduction operation discussed in this section is the same as the reproduction operation of the HD stream recorded as it is in the hard disk 10 without down-converted into the SD stream.

FIG. 12 is an extraction of the block diagram of FIG. 1 in which components for actually performing the reproduction operation of the HD quality image after the move back operation are shown. That is, mainly by the operation of the hard disk 11 and the HD decoder 41, the reproduction operation of the HD quality image after the move back operation is performed as mentioned above. Then, outputting the HD data to an external output device (e.g. various kinds of display or various kinds of audio device) connected to the output 1 allows the user to enjoy the HD quality image. Incidentally, in FIG. 12, there are also shown names of various kinds of data inputted and outputted among components.

As discussed above, according to this embodiment of the information record reproduction apparatus 1, the HD stream can be down-converted into the SD stream and recorded into the hard disk 10 or the optical disc 20. Therefore, it is possible to achieve a relative quick move operation of the SD stream or the like from the hard disk 10 to the optical disc 20. Furthermore, it is possible to reproduce the HD quality image again by performing the reproduction operation with using the scramble data as described above, even after the HD stream is down-converted into the SD stream and then recorded into the hard disk 10 or the optical disc 20. If the HD stream is recorded into the hard disk 10 or the optical disc 20 after the down-converted, only the scramble data quite different from the original HD stream is recorded in the hard disk 10. For this, the user can suitably enjoy the contents exhibiting desired reproduction quality, while the copyright of the contents is protected.

Incidentally, in the aforementioned embodiments, the optical disc 20 is a re-writable optical disc (e.g. a DVD-RW etc.) in conformity with CPRM. But the optical disc 20 may be a recordable optical disc (e.g. a DVD-R) in conformity with CPRM.

Furthermore, in the aforementioned embodiments, the hard disk 10 and the optical disc 20 has been discussed as an example of the record medium, and the recorder (or player) for the hard disk 10 and the optical disc 20 has been discussed as an example of the information record reproduction apparatus. Nevertheless, the present invention is not limited to the hard disk and the optical disc, or the recorder (player) therefor, but may be applied to other various kinds of record medium and the recorder (player) therefor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2004-138444 filed on May 7, 2004 including the specification, claims, drawings and summary is incorporated herein by reference in its entirety.

What is claimed is:

1. An information record apparatus comprising:
    a down-convert device for down-converting a first content information having a first reproduction quality into a second content information having a second reproduction quality which is lower quality than the first reproduction quality;
    a scramble device for generating scramble information by scrambling the first content information, on the basis of a predetermined scramble key;
    a first record device for recording the second content information and the scramble information into a first record medium;
    a second record device for recording the second content information into a second record medium; and
    a first delete device for deleting the second content information recorded in the first record medium, when the second content information is recorded into the second record medium.

2. The information record apparatus according to claim 1, further comprising: a key generate device for generating the scramble key, on the basis of at least a part of the second content information.

3. The information record apparatus according to claim 1, further comprising: an information generate device for generating the first content information, on the basis of the scramble information and the scramble key, respectively.

4. The information record apparatus according to claim 3, wherein
    the first record device records the generated first content information into the first record medium, and
    said information record apparatus further comprises:
    a second delete device for deleting the second content information recorded in the second record medium, when the generated first content information is recorded into the first record medium.

5. An information record method comprising:
    a down-convert process implemented in an information record reproduction apparatus for down-converting a first content information having a first reproduction quality into a second content information having a second reproduction quality which is lower quality than the first reproduction quality;
    a scramble process of generating scramble information by scrambling the first content information, on the basis of a predetermined scramble key;
    a first record process of recording the second content information and the scramble information into a first record medium;
    a second record process recording the second content information into a second record medium;
    a first delete process deleting the second content information recorded in the first record medium, when the second content information is recorded into the second record medium.

6. An information reproduction apparatus, said information reproduction apparatus comprising:
    a down-convert device for down-converting a first content information having a first reproduction quality into a second content information having a second reproduction quality which is lower quality than the first reproduction quality;
    a scramble device for generating scramble information by scrambling the first content information, on the basis of a predetermined scramble key;
    a first record device for recording the second content information and the scramble information into a first record medium, with desired reproduction quality;
    an information generate device for generating the first content information, on the basis of the scramble information and the scramble key, respectively;

a first reproduction device for reproducing the generated first content information;

a second record device for recording the second content information into a second record medium;

a first delete device for deleting the second content information recorded in the first record medium, when the second content information is recorded into the second record medium.

7. The information reproduction apparatus according to claim 6, further comprising: a second reproduction device for reproducing the second content information.

8. An information reproduction method, the method comprising:

down-converting via an information record reproduction apparatus a first content information having a first reproduction quality into a second content information having a second reproduction quality which is lower quality than the first reproduction quality;

generating scramble information by scrambling the first content information, on the basis of a predetermined scramble key;

recording the second content information and the scramble information into a first record medium, with desired reproduction quality;

generating the first content information, on the basis of the scramble information and the scramble key, respectively;

reproducing the generated first content information;

recording the second content information into a second record medium; and deleting the second content information recorded in the first record medium, when the second content information is recorded into the second record medium.

9. A tangible computer readable recording medium containing a computer program recorded thereon executed by a computer, causes the computer to perform a method comprising:

down-converting a first content information having a first reproduction quality into the second content information having a second reproduction quality which is lower quality than the first reproduction quality;

generating scramble information by scrambling the first content information, on the basis of a predetermined scramble key;

recording the second content information and the scramble information into the first record medium;

recording the second content information into a second record medium; and deleting the second content information recorded in the first record medium, when the second content information is recorded into the second record medium.

10. A tangible computer readable recording medium containing a computer program recorded thereon executed by a computer, causes the computer to perform a method comprising:

down-converting a first content information having a first reproduction quality into the second content information having a second reproduction quality which is lower quality than the first reproduction quality;

generating scramble information by scrambling the first content information, on the basis of a predetermined scramble key;

recording the second content information and the scramble information into a first record medium, with desired reproduction quality;

generating the first content information, on the basis of the scramble information and the scramble key, respectively;

reproducing the generated first content information;

recording the second content information into a second record medium; and deleting the second content information recorded in the first record medium, when the second content information is recorded into the second record medium.

* * * * *